(12) United States Patent
Bauch et al.

(10) Patent No.: US 6,342,006 B1
(45) Date of Patent: Jan. 29, 2002

(54) METERING RECYCLED-TAILINGS STREAM IN COMBINE HARVESTER

(75) Inventors: Heiko Bauch, Bautzen; Henri Scholtke; Hans-Jörg Seiler, both of Obergurig, all of (DE)

(73) Assignee: Case Harvesting Systems GmbH, Neustadt (DE)

( * ) Notice: Subject to any disclaimer, the term of this patent is extended or adjusted under 35 U.S.C. 154(b) by 0 days.

(21) Appl. No.: 09/531,255

(22) Filed: Mar. 17, 2000

(30) Foreign Application Priority Data

Mar. 19, 1999 (DE) .......................... 199 12 372

(51) Int. Cl.$^7$ .......................... A01D 75/18; A01F 12/16; A01F 21/00
(52) U.S. Cl. .......................... 460/4; 56/DIG. 15; 73/579
(58) Field of Search .................. 460/4, 5; 56/10.2 R, 56/DIG. 15; 340/604; 450/4; 73/579, 584

(56) References Cited

U.S. PATENT DOCUMENTS

| | | | |
|---|---|---|---|
| 3,593,720 A | * 7/1971 | Botterill | 460/1 |
| 3,610,252 A | * 10/1971 | De Coene | |
| 4,296,409 A | * 10/1981 | Whitaker et al. | 340/684 |
| 4,360,998 A | * 11/1982 | Somes | 460/5 |
| 4,466,230 A | * 8/1984 | Osselaere et al. | 460/5 |
| 4,517,792 A | * 5/1985 | Denning et al. | 460/5 |
| 4,540,003 A | * 9/1985 | Osselaere | 460/5 |
| 4,875,889 A | * 10/1989 | Hagerer et al. | 460/1 |
| 4,902,264 A | 2/1990 | Diekhans | |
| 5,015,997 A | * 5/1991 | Strubbe | 340/684 |
| 6,125,702 A | * 10/2000 | Kuchar | 73/579 |

FOREIGN PATENT DOCUMENTS

| | | |
|---|---|---|
| DE | 24 45 045 | 4/1976 |
| DE | 0 463 240 | 1/1992 |
| DE | 41 38 533 | 5/1993 |
| DE | 196 18 042 | 11/1997 |
| EP | 0339142 | 11/1989 |
| GB | 1552794 | 9/1979 |

OTHER PUBLICATIONS

"Abernten Statt Abwarten . . . ", CLAAS Vertriebsgesellschaft MbH; Claas Technoparcdas Austellungszentrum in Harseeinkel; 3 pages, iu German; Aug. 1995.

* cited by examiner

Primary Examiner—Thomas B. Will
Assistant Examiner—Árpád F Kovács
(74) Attorney, Agent, or Firm—Herbert Dubno; Andrew Wilford

(57) ABSTRACT

A harvester has a thresher for receiving at an intake a mixture of straw and grain and for separating the mixture into grain, straw, and tailings comprised of mixed grain and straw and a conveyor recirculates a stream of the tailings along a path back to the intake. A sensor is positioned in the path and intercepts at least a portion of the stream for counting a number of grains in the portion of the stream passing the sensor. The conveyor includes an elevator for raising the tailings stream to a location above the sensor and for dropping the tailings stream on the sensor. The thresher includes a main threshing drum and a cleaning unit downstream therefrom.

8 Claims, 3 Drawing Sheets

METERING RECYCLED-TAILINGS STREAM IN COMBINE HARVESTER

FIELD OF THE INVENTION

The present invention relates to a combine harvester. More particularly this invention concerns a system for metering the recycled-tailings stream in such a harvester.

BACKGROUND OF THE INVENTION

A standard combine harvester cuts standing crop and threshes it to separate the grain from surrounding husks, stems, dust particles and the like, generically referred to as the straw. After initial threshing and separation of a portion of the straw, the grain still carrying considerable straw is fed to a cleaning mechanism that separates out more of the straw and feeds the grain to the grain tank of the machine.

The material separated by the cleaning mechanism from the grain is referred to as tailings and, while it is mainly straw, includes a certain percentage of grain. If the threshing and cleaning mechanisms are set so as to substantially eliminate grain in these tailings, they will normally work too slowly for efficient harvesting. Thus a certain inefficiency is accepted in the cleaning mechanism.

In order not to lose the valuable grain fraction of the tailings, they are typically recirculated back to the cleaning mechanism, to the intake thresher, or even to a separate rethreshing unit so that the machine has a second chance to separate out the desired grain. Thus the incoming stream of cut crop is separated into three fractions—the grain, the straw, and the tailings—and the tailings are reintroduced into the crop stream upstream of the separation stage.

The standard Claas machines route the recycle stream so that the machine operator can actually look at it. This permits an experienced machine operator to adjust various parameters, such as travel speed and sieve spacing, to optimize harvesting efficiency. Even with a very experienced operator, this system is highly inaccurate. A flow that is too large is an indication that the cleaning mechanism is working inefficiently and has the corollary disadvantage of overloading the cleaning mechanism by, in effect, running a too large portion of the crop through it twice. A flow that is to small is normally an indication that the cleaning device is either passing too many impurities or working too slowly. Normally the weight rate of the tailings flow is held to about 5% to 10% of the grain flow into the grain tank.

The combine harvester described in EP 0,463,240 of Paquet eliminates the factor of operator error by automatically metering the flow of the recycle stream and automatically resetting the cleaning mechanism to maintain the desired amount of recycle flow. Similarly German patent documents 2,445,045 of Graeber, 4,138,533 of Allworden, and 196 18 042 of Dalmer propose various arrangements that measure the overall flow, that is mass passed per unit of time, in the recycle conduit in a combine, forage harvester, field chopper, or the like.

All of these system are relatively inefficient in optimizing the efficiency of the harvester. The tailings-recycle stream can seem too big when it actually is mainly straw with a minor fraction of recoverable grain, or can seem quite small when it actually is carrying a considerable amount of recoverable grain. The condition of the crop, its moisture content for example, can vary the effective size and/or mass of the crop stream and thereby cause grain to be wasted or excess tailings to be reprocessed.

OBJECTS OF THE INVENTION

It is therefore an object of the present invention to provide an improved system for monitoring the recycled-tailings stream in a crop harvester.

Another object is the provision of such an improved system for monitoring the recycled-tailings stream in a crop harvester which overcomes the above-given disadvantages, that is which accurately determines the real efficiency of the grain separator and provides an output that allows the harvester to be set for maximum grain recovery and minimal straw recycling.

SUMMARY OF THE INVENTION

A harvester has a thresher for receiving at an intake a mixture of straw and grain and for separating the mixture into grain, straw, and tailings comprised of mixed grain and straw and a conveyor recirculates a stream of the tailings along a path back to the intake. According to the invention a sensor is positioned in the path and intercepts at least a portion of the stream for counting a number of grains in the portion of the stream passing the sensor.

Thus in accordance with the instant invention the actual volume of the tailings stream is largely ignored. It is the actual count of grains in the tailings stream that is critical. How many grains pass the sensor in a given unit if time is an excellent gauge of how efficiently the harvester is operating since, if it is producing a considerable tailing stream but there is very little recoverable grain in it, the fact that the tailings stream is large does not really signify much. On the other hand if the tailing stream is meager, but is formed in large part by recoverable grain, this fact is important to note when adjusting how the machine operates.

The conveyor includes an elevator for raising the tailings stream to a location above the sensor and for dropping the tailings stream on the sensor. To this end the sensor can simply be constituted basically as a microphone that pings when directly impinged by a hard object, and virtually the only hard objects in the tailings stream are grain kernels. The sensor can be provided at the suction intake where the tailings are initially picked up and conveyed also. It can also be provided in a region where the tailings are projected centrifugally, that is the tailings can actually be thrown against the sensor.

The thresher in accordance with the invention includes a main threshing drum and a cleaning unit downstream therefrom. The conveyor can feed the tailings stream back to the drum. Alternately it can feed it directly to the cleaning unit since there is little in the tailings that really needs the coarse conminution done by the threshing drum at the thresher intake. Alternately the system can have a separate rethresher that the tailings are fed to.

The intake is horizontally elongated and the conveyor includes a housing extending above and parallel to the intake and having an array of downwardly open holes and an auger in the housing for displacing the tailings stream therethrough such that particles of the stream drop through the holes. The sensor is elongated, extends parallel to the housing and intake, and is underneath the holes. These holes can be varied in size by juxtaposing the perforated lower wall of the housing with a slidable sieve that is identically apertured so when the holes of the sieve and housing are perfectly aligned, the holes are of their maximum flow cross section but when the sieve is offset the mesh size is reduced. Appropriate hydraulic, pneumatic, or electric actuators can be used to control the sifting action of the housing lower wall.

The housing according to the invention has an inner end above one end of the intake and an open outer end above a generally central portion of the intake so that any tailings that have not dropped through the holes are ejected by the auger at the open outer end of the housing. Thus there is a sifting action in this distributor housing so that virtually all of the grain in the tailings will drop through the holes before the balance of the tailings is ejected by the auger from the housing end.

The system further has according to the invention a display for displaying the number of grains counted by the sensor. Thus the operator of the machine can determine what action to take when tailings-grain count changes, or at least can monitor what the machine is doing and override if necessary.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
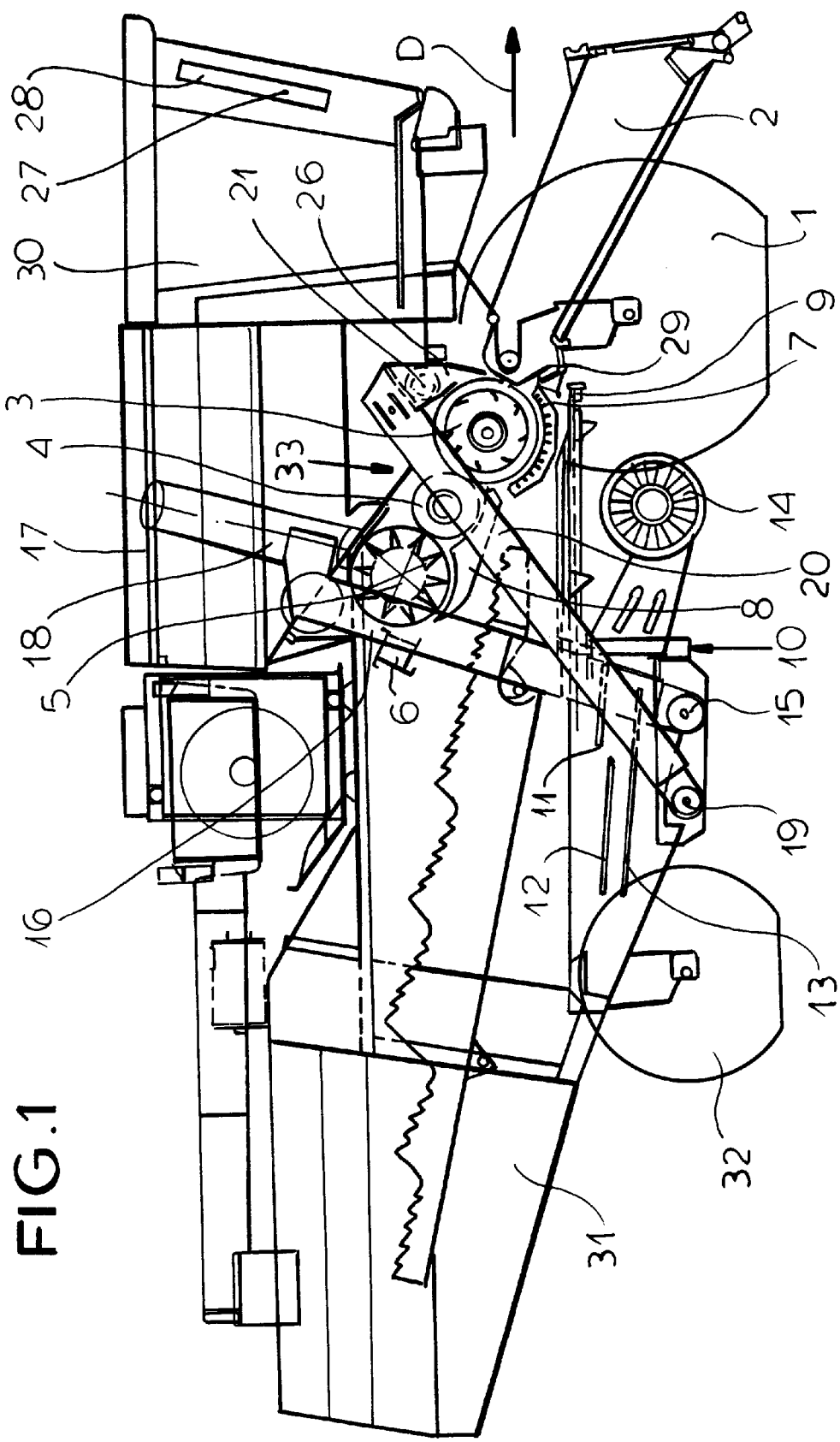
FIG. 1 is a small-scale side view in vertical section through a harvester according to the invention.

As seen in FIG. 1 a combine harvester has a frame 31 supported on the ground by front drive wheels 1 and rear steering heels 32 and carrying a header 2 on which is mounted an unillustrated cutter or adapter. The rear end of the header chute 2 opens into a four-drum thresher 33 constituted by a threshing drum or cylinder 3, a straw beater 4, a separating rotor 5, and a straw-feeding drum or rotor 6. The lower region of the threshing cylinder 3 is surrounded by a concave 7 and the drums 4 and 5 have separate separating concaves 8. Extending horizontally underneath the entire four-drum thresher 33 is a grain pan 9 whose rear end extends under a cleaning mechanism 10 which is formed by a first upper sieve 11, a second upper sieve 12, a one-piece lower sieve 13, and a cleaning fan 14. Below the lower sieve 13 is a grain-conveying auger 15 that is at least as long as the lower sieve 13 is wide and whose axis extends horizontally perpendicular to a travel direction D of the harvester. The auger 15 feeds the lower end of an upright auger-type grain elevator or conveyor 16 that empties via another auger conveyor 18 into a grain tank 17 provided immediately behind an operator's cabin 30 so an operator of the machine can monitor the quality of the grain being harvested.

Behind the grain auger 15 is a tailings auger or conveyor 19 associated with an upright auger-type tailings elevator or conveyor 20 whose upper outlet end is situated above and ahead of the threshing drum 3. The heavier tailings fraction, including some grain and denser straw particles, that does not fall through the sieve 13 and that is not blown away by the fan 14 drops down and collects at this conveyor 19. A horizontal auger-type conveyor 21 extends at the outlet end of the conveyor 20 almost across the full width of the drum 3 but is connected at at least one location with the frame 22 carrying the drum 3. A housing 23 completely surrounds the auger 21. Thus the tailings picked up by the conveyor 19 are fed up through the elevator 20 to the conveyor 21 which feeds then across the width of the machine while also passing down out of the housing 23.

Figure 2:
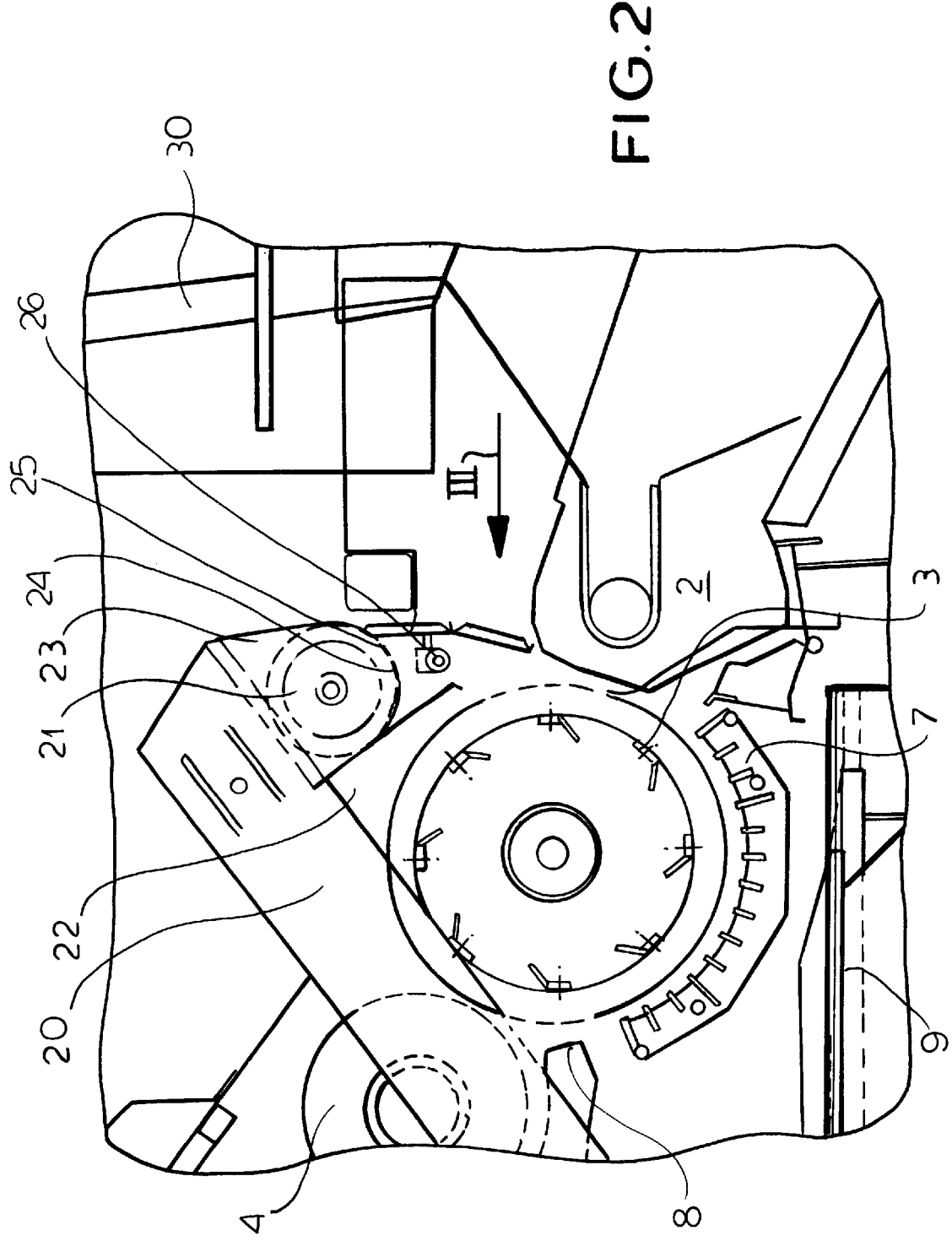
FIG. 2 is a large-scale view of a detail of FIG. 1.
Figure 3:
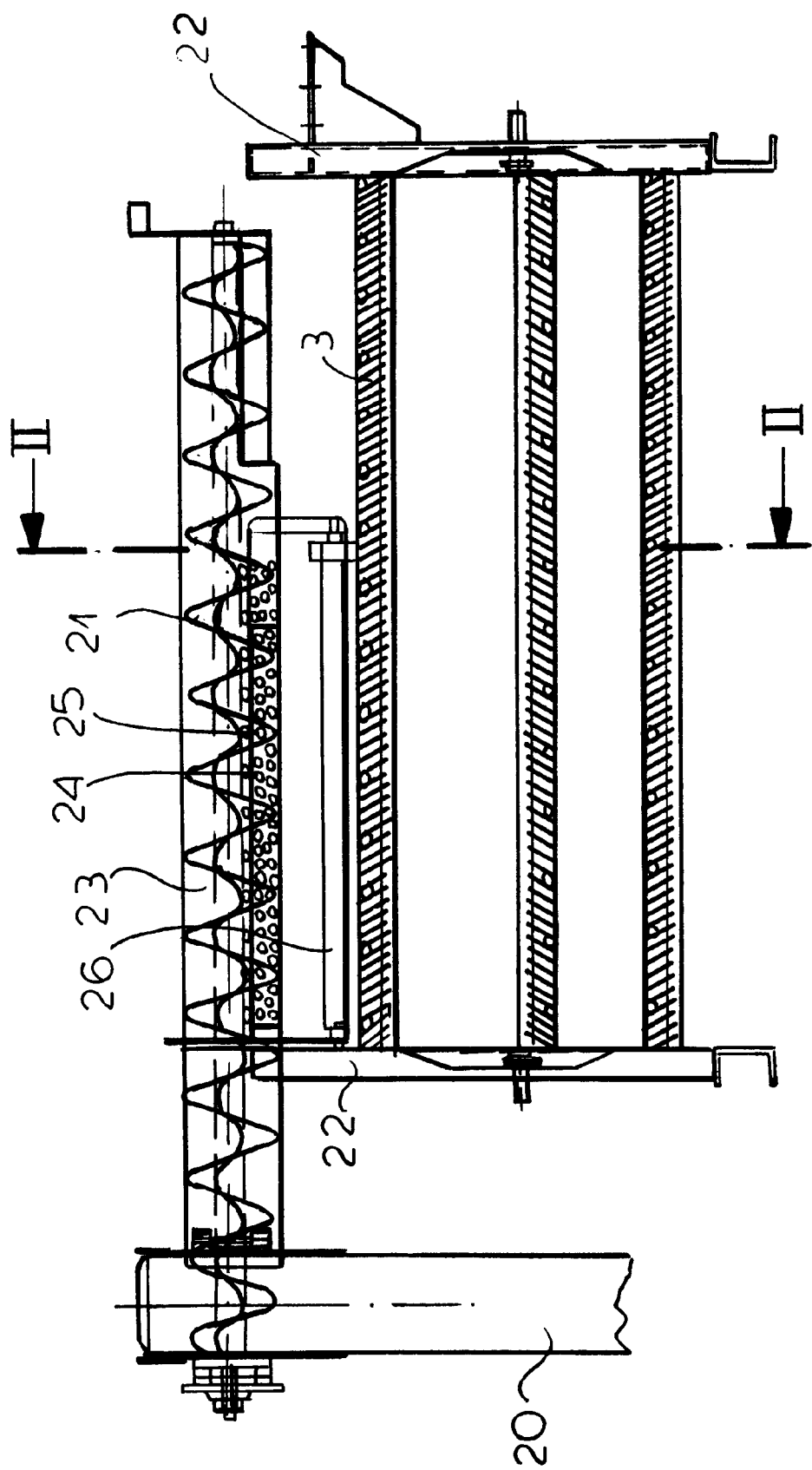
FIG. 3 is a view taken in the direction of arrow III of FIG. 2, line II—II in FIG. 3 indicating the section plane of FIG. 2.

FIGS. 2 and 3 show in larger scale how the housing is formed on its lower side with holes 24 that start on the right side of the drum 3 and extend about to its center. A portion 25 of the housing 23 is movable to vary the size of these holes 24 and thus change mesh size. The remaining portion of the housing 23 to the left of the holes 24 is completely open. Thus the holes 24 form a sieve through which the tailings received from the elevator 20 can drop to the threshing unit 33.

In accordance with the invention a kernel-counting sensor 26 extends as shown in FIG. 3 across somewhat more than half of the width of the drum 3. This sensor 26 is connected with a display 27 of a controller 28 having a circuit that can evaluate the input it provides. The sensor 26 is formed as an elongated microphone extending over somewhat more than half of the width of the harvester underneath the openings 24. Thus the tailings from the elevator 20 will drop through the openings 24 onto the sensor 26 and the actual kernels of grain will produce pings with each impingement and these pings are counted to calculate the amount of grain passing the sensor 26 in a predetermined amount of time. If the tailings stream fed by the conveyor 20 is very large, it can flow past the holes 24 and out the open side of the housing 23 where it can drop unimpeded into the threshing drum 3. Thus blockages are unlikely and sensitivity is not significantly affected because most of the grain will have already been sifted out of the tailings through the holes 24. The controller 28 in turn is connected to control elements 29 of the threshing system 33 to adjust it according to the amount of grain actually detected by the sensor 26. Alternately it can be left to the operator in the cabin 30 to take appropriate ate action according to what is shown on the display 27.

We claim:

1. In a harvester having threshing means for receiving at an intake a mixture of straw and grain and for separating the mixture into grain, straw, and tailings comprised of mixed grain and straw; and conveyor means for recirculating a stream of the tailings along a path back to the intake and including a housing extending above and parallel to the intake and having structure forming an array of downwardly open holes and an auger in the housing for displacing the tailings stream therethrough such that particles of the stream drop through the holes, the improvement comprising:

means including a sensor positioned in the path downstream of the structure and intercepting at least a portion of the stream for counting a number of grains in the portion of the stream passing through the holes and intercepted by the sensor.

2. The improved harvester defined in claim 1 wherein the conveyor means includes an elevator for raising the tailings stream to a location above the sensor and for dropping the tailings stream on the sensor.

3. The improved harvester defined in claim 1 wherein the thresher includes a main threshing drum and a cleaning unit downstream therefrom.

4. The improved harvester defined in claim 3 wherein the conveyor means feeds the tailings stream back to the drum.

5. The improved harvester defined in claim 1, further comprising a display for displaying the number of grains counted by the sensor.

6. In a harvester having threshing means for receiving at a horizontally elongated intake a mixture of straw and grain and for separating the mixture into grain, straw, and tailings comprised of mixed grain and straw; and conveyor means for recirculating a stream of the tailings along a path back to the intake and including
- a housing extending above and parallel to the intake and having an array of downwardly open holes and
- an auger in the housing for displacing the tailings stream therethrough such that particles of the stream drop through the holes, the improvement comprising:

means including an elongated sensor positioned in the path, extending parallel to the housing and intake and underneath the holes, and intercepting at least a portion of the stream for counting a number of grains in the portion of the stream passing the sensor.

7. The improved harvester defined in claim 6 wherein the conveyor means further includes means for varying sizes of the holes.

8. The improved harvester defined in claim 6 wherein the housing has an inner end above one end of the intake and an open outer end above a generally central portion of the intake, whereby any tailings that have not dropped through the holes are ejected by the auger at the open outer end of the housing.

* * * * *